United States Patent Office.

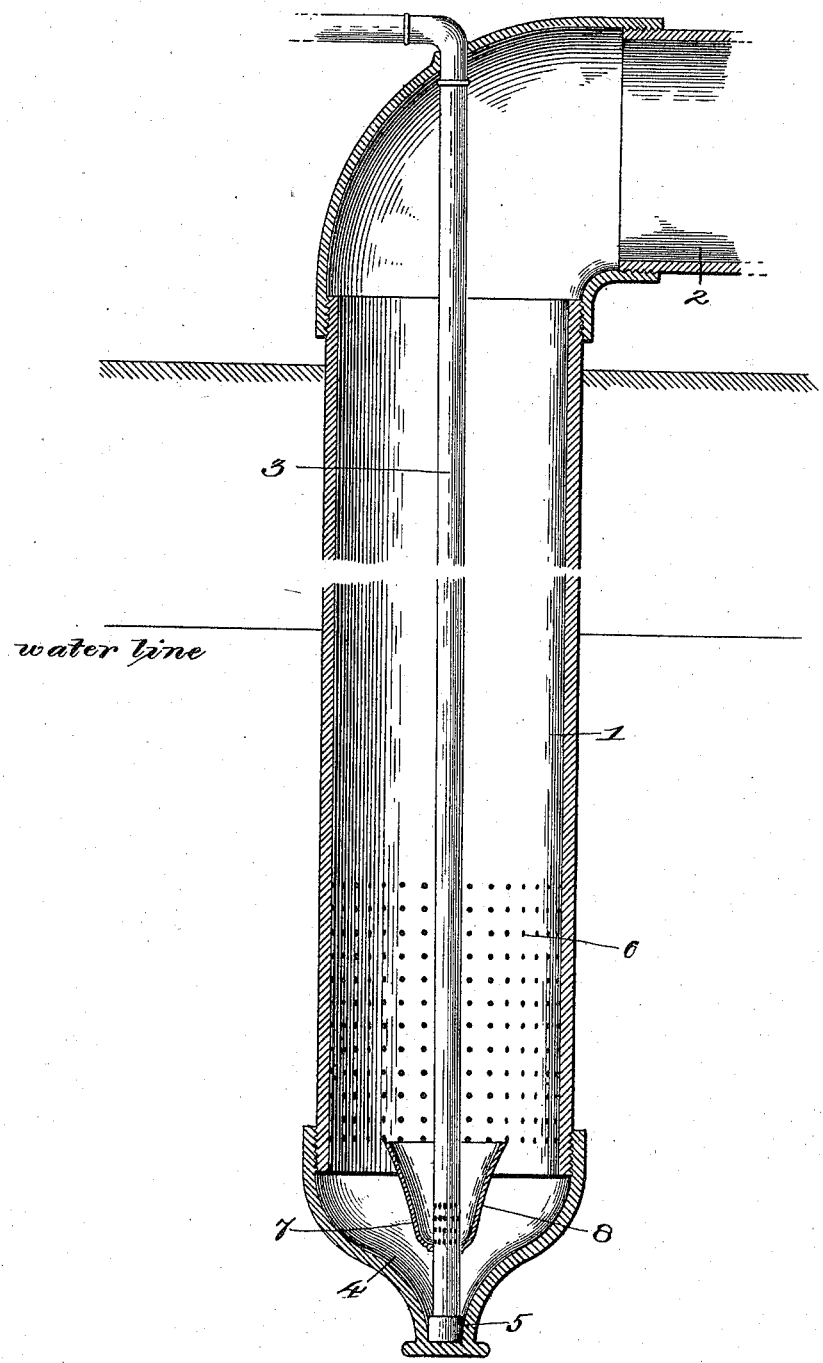

WILLIAM MILLER AND EDWARD O. THOMPSON, OF THOMASVILLE, GEORGIA.

AIR-LIFT PUMP.

SPECIFICATION forming part of Letters Patent No. 579,069, dated March 16, 1897.

Application filed March 28, 1896. Serial No. 585,286. (No model.)

*To all whom it may concern:*

Be it known that we, WILLIAM MILLER and EDWARD O. THOMPSON, citizens of the United States, residing at Thomasville, in the county of Thomas and State of Georgia, have invented a new and useful Air-Lift Pump, of which the following is a specification.

Our invention relates to air-lift pumps, and has for its object to provide a simple, compact, and efficient arrangement of parts whereby the output of liquid is increased over that of devices for a similar purpose heretofore employed, such increase in the volume of the discharge being secured without increase in the quantity of air required.

Further objects and advantages of this invention will appear in the following description, and the novel features thereof will be particularly pointed out in the appended claims.

The drawing represents a vertical central section of a pump constructed in accordance with our invention.

1 designates an uptake-pipe communicating with a discharge-pipe 2, and arranged axially in the uptake-pipe is an air-supply pipe 3. The uptake-pipe is provided near its lower end with a plurality of inlet-perforations which are evenly distributed throughout the circumference thereof, the lower end of the pipe being closed by a reduced cap 4, having a central depression or socket 5, in which is fitted or stepped the lower extremity of the air-supply pipe, and within this cap 4 and below the plane of the lowermost perforations 6 in the uptake-pipe the air-supply pipe is provided with outlet-perforations 7, also arranged circumferentially to distribute the air evenly to all parts of the cross-sectional area of the uptake-pipe.

Secured to and supported by the air-supply pipe is an upwardly-flared deflecting or concentrating cup 8 of approximately inverted-bell shape, the attachment thereof to the air-supply pipe being below the plane of the perforations 7, and the rim or periphery thereof being above the plane of the uppermost perforations 7, whereby the air discharged from the air-supply pipe is forced upwardly in a gradually-widening column and leaves the deflecting or concentrating cup 8 approximately at the plane of the lowermost perforations 6.

Inasmuch as the lower end of the uptake-pipe is closed and the air-outlet perforations are arranged below the water-inlet perforations the fine streams of water admitted under pressure through the perforations 6 will be intersected by and will come into intimate contact with the upwardly-discharged column of air with the result that the water will be lifted in the uptake-pipe and will be discharged in an approximately continuous stream.

The arrangement of the water-inlet perforations in the side of the uptake-pipe causes the introduction of the water in thin radial streams, which are projected inwardly in approximately horizontal directions to the center of said pipe, while the introduction of the air by means of lateral perforations in the concentric air-supply pipe, these air-outlet perforations being arranged below the plane of the lowermost series of water-inlet perforations, insures the complete aeration of the liquid and hence reduces the specific gravity of the column of water within the uptake-pipe without waste of the air, said aeration being accomplished uniformly. This operation of aerating the water is also greatly facilitated by the upwardly-flared deflecting and concentrating cup, which incloses the portion of the air-supply pipe which is provided with said air-outlet perforations and is located below the plane of the lowermost series of water-inlet perforations, said concentrating-cup being arranged to deflect the column of air upwardly and at the same time spread it from the center outwardly, whereby the admixture of the air with the water, due to the inward and downward tendency of the streams of water and the upward and outward tendency of the column of air, is complete and uniform.

The above-described arrangement of parts also guards against the column of air forcing its way through the liquid and escaping without performing its portion of the lifting operation.

Various changes in the form, proportion, and the minor details of construction may be resorted to without departing from the spirit or sacrificing any of the advantages of this invention.

Having described our invention, what we claim is—

1. In an air-lift pump, the combination of an uptake-pipe having a closed lower end and provided with lateral inlet-perforations whereby the liquid is introduced in radial streams, a concentric air-supply pipe provided with lateral air-outlet perforations below the plane of said inlet-perforations to discharge air radially, and an upwardly-flared deflecting and concentrating cup inclosing the portion of the air-supply pipe which is provided with air-outlet perforations and also arranged below said inlet-perforations, substantially as specified.

2. An air-lift pump having an uptake-pipe provided with lateral perforations, a cap closing the lower end of the uptake-pipe and provided with a central depression or socket, an air-supply pipe arranged concentrically in the uptake-pipe and stepped at its lower extremity in said central depression or socket, said air-supply pipe being provided below the plane of the perforations in the uptake-pipe with air-outlet perforations, and an upwardly flared or inverted bell-shaped deflecting and concentrating cup secured to the air-supply pipe at a point below the perforations therein and having its rim or periphery arranged above the plane of the air-outlet perforations and approximately in the plane of the lowermost inlet-perforations of the uptake-pipe, substantially as specified.

In testimony that we claim the foregoing as our own we have hereto affixed our signatures in the presence of two witnesses.

WILLIAM MILLER.
EDWARD O. THOMPSON.

Witnesses:
S. L. HUYER,
E. DREYER.